US011785085B2

(12) United States Patent
Mermet-Grandfille et al.

(10) Patent No.: US 11,785,085 B2
(45) Date of Patent: Oct. 10, 2023

(54) CONTROL INTERFACE FOR THE DEPLOYMENT OF AN APPLICATION, SYSTEM AND METHOD USING SUCH A CONTROL INTERFACE

(71) Applicant: AGARIK SAS, Saint-Ouen (FR)

(72) Inventors: Alexis Mermet-Grandfille, Meylan (FR); Ana Juan Ferrer, Barcelona (ES)

(73) Assignee: AGARIK SAS, Saint-Ouen (FR)

( * ) Notice: Subject to any disclaimer, the term of this patent is extended or adjusted under 35 U.S.C. 154(b) by 0 days.

(21) Appl. No.: 17/693,266

(22) Filed: Mar. 11, 2022

(65) Prior Publication Data

US 2022/0294851 A1 Sep. 15, 2022

(30) Foreign Application Priority Data

Mar. 12, 2021 (EP) ..................................... 21305305

(51) Int. Cl.
*H04L 67/1097* (2022.01)
*G06F 8/61* (2018.01)
*H04L 67/06* (2022.01)

(52) U.S. Cl.
CPC ............ *H04L 67/1097* (2013.01); *G06F 8/63* (2013.01); *H04L 67/06* (2013.01)

(58) Field of Classification Search
CPC ........ H04L 67/1097; H04L 67/06; G06F 8/63
See application file for complete search history.

(56) References Cited

U.S. PATENT DOCUMENTS 10,270,841 B1 * 4/2019 Thomason .............. H04L 69/24
10,324,759 B1 * 6/2019 Paquette .................. H04L 67/34
10,511,481 B1 * 12/2019 Castellanos ......... H04L 41/0883
(Continued)

FOREIGN PATENT DOCUMENTS

CA       2999662 A1 * 11/2018 ........... G06F 9/5072
CN   109710270 A  *  5/2019
(Continued)

OTHER PUBLICATIONS

European Search Report issued in EP21305305.1, dated Aug. 17, 2021 (11 pages).

*Primary Examiner* — Shean Tokuta
(74) *Attorney, Agent, or Firm* — ARC IP LAW, PC; Joseph J. Mayo (57) ABSTRACT

A control interface for deployment of an application, the control interface running on a specific cloud provider and connected to a plurality of other control interfaces running on a plurality of cloud providers, wherein the control interface is connected to a cloud provider database storing a description of each cloud provider. The control interface includes a cloud driver specific to the cloud provider on which the control interface is running, the cloud driver allowing the control interface to instruct the cloud provider to deploy components of the application. The control interface includes means to receive an attribute file describing the application to deploy; means to select for each component of the application, based on the descriptions provided by the cloud provider database and the attribute file, a cloud provider suitable for the deployment; for each selected cloud provider, means to send to the corresponding control interface the component to deploy.

12 Claims, 2 Drawing Sheets

(56) References Cited

U.S. PATENT DOCUMENTS

| | | | | |
|---|---|---|---|---|
| 10,841,155 | B2* | 11/2020 | Angell | H04L 67/10 |
| 11,340,837 | B1* | 5/2022 | Vohra | G06F 3/0605 |
| 2010/0266110 | A1* | 10/2010 | Soo | H04L 65/1016 |
| | | | | 379/201.12 |
| 2012/0005264 | A1* | 1/2012 | McWhirter | G06F 9/5072 |
| | | | | 709/246 |
| 2012/0117560 | A1* | 5/2012 | Vorthmann | G06F 8/60 |
| | | | | 717/177 |
| 2012/0239739 | A1* | 9/2012 | Manglik | G06F 8/61 |
| | | | | 709/203 |
| 2013/0263209 | A1* | 10/2013 | Panuganty | H04L 41/5025 |
| | | | | 709/224 |
| 2014/0012965 | A1* | 1/2014 | Ding | H04L 41/5061 |
| | | | | 709/221 |
| 2015/0263894 | A1* | 9/2015 | Kasturi | H04L 41/0897 |
| | | | | 709/222 |
| 2015/0378702 | A1* | 12/2015 | Govindaraju | G06F 8/60 |
| | | | | 717/177 |
| 2016/0366233 | A1* | 12/2016 | Le | H04L 67/51 |
| 2017/0134519 | A1* | 5/2017 | Chen | H04L 67/10 |
| 2017/0201569 | A1* | 7/2017 | Fu | G06F 8/60 |
| 2017/0353348 | A1* | 12/2017 | Gunjal | H04L 41/5025 |
| 2018/0095739 | A1* | 4/2018 | Baset | G06F 8/71 |
| 2018/0248827 | A1* | 8/2018 | Scharber | H04L 51/18 |
| 2018/0267830 | A1* | 9/2018 | Rivera | G06F 9/5072 |
| 2018/0316550 | A1* | 11/2018 | Patel | H04L 41/5051 |
| 2018/0357097 | A1* | 12/2018 | Poort | G06F 9/547 |
| 2019/0207867 | A1* | 7/2019 | Sivasubramanian | G06F 9/541 |
| 2019/0220292 | A1* | 7/2019 | Chen | H04L 41/0803 |
| 2019/0327238 | A1* | 10/2019 | Chen | H04L 63/102 |
| 2019/0340059 | A1* | 11/2019 | Bagarolo | G06F 8/71 |
| 2020/0014609 | A1* | 1/2020 | Hockett | H04L 43/08 |
| 2020/0106711 | A1* | 4/2020 | Sok | H04L 47/70 |
| 2020/0267208 | A1 | 8/2020 | Chen et al. | |
| 2020/0404051 | A1* | 12/2020 | Guniguntala | H04L 67/10 |
| 2021/0099459 | A1* | 4/2021 | Zhang | H04L 63/104 |
| 2021/0133734 | A1* | 5/2021 | Jensen | G06F 9/466 |
| 2021/0200596 | A1* | 7/2021 | Sanchez | G06F 9/5038 |
| 2021/0211363 | A1* | 7/2021 | Papacica | H04L 41/5051 |
| 2021/0224093 | A1* | 7/2021 | Fu | G06F 9/5072 |
| 2021/0240459 | A1* | 8/2021 | Ranjan | G06F 9/5055 |
| 2021/0263667 | A1* | 8/2021 | Whitlock | G06F 3/0614 |
| 2021/0286638 | A1* | 9/2021 | Fan | H04L 43/0852 |
| 2021/0382912 | A1* | 12/2021 | Horowitz | H04L 63/166 |
| 2022/0294851 | A1* | 9/2022 | Mermet-Grandfille | |
| | | | | H04L 67/1097 |
| 2022/0318068 | A1* | 10/2022 | Shilawat | G06Q 50/10 |

FOREIGN PATENT DOCUMENTS

| | | | | |
|---|---|---|---|---|
| CN | 112231050 A | * | 1/2021 | |
| EP | 1705868 A2 | * | 9/2006 | H04L 63/0815 |
| EP | 3128418 A1 | | 2/2017 | |
| EP | 3330854 A1 | * | 6/2018 | G06Q 10/06 |
| EP | 4057144 A1 | * | 9/2022 | G06F 8/63 |
| WO | WO-2012069064 A1 | * | 5/2012 | G06F 9/5072 |
| WO | WO-2014100944 A1 | * | 7/2014 | H04L 12/6418 |
| WO | WO-2014101475 A1 | * | 7/2014 | H04L 67/1095 |
| WO | WO-2014101727 A1 | * | 7/2014 | G06F 8/60 |

* cited by examiner

CONTROL INTERFACE FOR THE DEPLOYMENT OF AN APPLICATION, SYSTEM AND METHOD USING SUCH A CONTROL INTERFACE

TECHNICAL FIELD

The technical field of the invention is the one of application deployment.

The present invention regards the deployment of serverless applications in the cloud and in particular the deployment of applications across a plurality of cloud providers.

STATE OF THE ART

As of today, cloud application developers have access to the so called "serverless" services where a developer can give to a cloud provider an application source code and let the cloud control plane package, deploy and run this application. But each cloud providers have their own APIs and do not offer a unified application deployment and control experience.

With technologies like Kubernetes cluster federation, the ability to move an application container between clusters is possible but it remains limited to compute layer made of microservices and is still difficult as each cloud provider has their special customizations of their Kubernetes©. For instance, security models are still very cloud provider specific for the offered facilities and the data is offered through persistent storage facilities which are varying by cloud providers. The cluster management, autoscaling, network and security also have some differences that do not offer a unified cross cloud provider experience.

With the growing number of different cloud locations, types (public, edge, on premise) and cloud services to use, developers are facing increased difficulties to specify and deploy their applications in one or a combination of cloud locations. Furthermore, each cloud provider has variations in the way they expose their services and the increased complexity for the development teams is a factor of human error leading to invalid deployments, unlawful workload locations or other human factor related mistakes. As a matter of fact, in the current schema, portability among cloud providers is still a manual and costly task whereas hybrid cloud execution in operation is still not operational.

There is a need for a solution to deploy, control and monitor seamlessly an application across different cloud providers.

SUMMARY OF THE INVENTION

To allow such a deployment, the invention proposes a control interface running on a cloud provider that can interact with said cloud provider using a cloud driver. The control interface of the invention is further able to communicate with other similar control interfaces running on other cloud providers to from a mesh interface and allows an easy deployment across different cloud providers.

A first aspect of the invention relates to a control interface for the deployment of an application, said control interface running on a specific cloud provider, said control interface being connected to a plurality of other control interfaces running on a plurality of cloud providers, said control interface being further connected to a cloud provider database storing a description of each cloud provider of the plurality of cloud providers, the control interface comprising:

A cloud driver specific to the cloud provider on which the control interface is running, said cloud driver allowing the control interface to instruct the cloud provider to deploy one or more components of an application;

means to receive, from a user, an attribute file describing an application to deploy;

means to select, for each components of the application, based on the descriptions provided by the cloud provider database and the attribute file, a cloud provider suitable for the deployment of said component;

for each selected cloud providers, means to send to the corresponding control interface the component to deploy;

when receiving a component to deploy from another control interface of the plurality of control interface, means to deploy said component using the cloud driver.

Thanks to the control interface according to the invention, the different component of an application can be deployed in different cloud providers without the need for the user to consider the specificity of each cloud provider. This is made possible by the presence, for each cloud provider, of a control interface according to the invention that can abstract the specificity of the cloud provider thanks to the cloud driver.

The control interface according to the first aspect of the invention may also have one or more of the following characteristics, considered individually or according to any technically possible combinations thereof.

In an embodiment, the control interface further comprises:

means to receive from the deployed components events related to the state of said components;

means to transmit the received events to one or more control interface of the plurality of control interfaces;

means to receive events from other control interfaces of the plurality of control interfaces;

means to transmits events to the user.

In an embodiment, the control interface further comprises:

means to check the status of the components running on its cloud provider;

means to compare the status of a component to the attributes of said component;

when the attributes are not respected, means to transmits an alert to the user and/or one or more control interfaces of the plurality of control interfaces;

means to receive alerts from other control interfaces of the plurality of control interfaces.

In an embodiment, the control interface further comprises, when an alert is emitted for a given component, means to redeploy the application associated with said component.

A second aspect of the invention relates to a computer system comprising a plurality of control interfaces according to a first aspect of the invention and a cloud provider database containing a description of a plurality of cloud providers on which the control interfaces of the plurality of control interfaces are running, the control interfaces of the plurality of control interfaces being connected to the cloud provider database and between themselves to form a mesh interface, the system being configured to:

Using one control interface of the plurality of control interfaces, said initial control interface, read a file provided by a user and containing the attributes of an application to deploy;

for each component of the application, using the initial control interface, determine, based on the descriptions provided by the cloud provider database and the attributes of the application, the possible deployment solutions offered by the plurality of cloud providers;

for each selected cloud provider, using the initial control interface, send the component to deploy to the corresponding control interfaces;

for each control interface receiving a component to deploy, using the cloud driver of said control interface, deploy said component on the corresponding cloud provider.

The system according to the second aspect of the invention may also have one or more of the following characteristics, considered individually or according to any technically possible combinations thereof.

In an embodiment, each control interface of the system is configured to:

receive from, the component they have deployed, events related to the state of said component; and transmit the received events to the initial control interface;

Furthermore, the initial control interface is configured to:

receive said events; and transmits events to the use.

In an embodiment, each control interface of the system is configured to:

check the status of the components running on its cloud provider;

compare the status of a components to the attributes of said components; and when the attributes are not respected, transmits an alert to the initial control interface;

Furthermore, the initial control interface is configured to:

receive said alerts;

transmit said alerts to the user.

In an embodiment, the initial control interface is configured to, when receiving an alert concerning one or more components, redeploy the application.

A third aspect of the invention relates to an attribute-based deployment method using a computer system according to a second aspect of the invention, the method comprising:

Using one control interface of the plurality of control interfaces, said initial control interface, the step of reading a file provided by a user and containing the attributes of an application to deploy;

for each component of the application, using the initial control interface, the step of determining, based on the descriptions provided by the cloud provider database and the attributes of the application, the possible deployment solutions offered by the plurality of cloud providers;

for each selected cloud provider, using the initial control interface, the step of sending the component to deploy to the corresponding control interfaces;

for each control interface receiving a component to deploy, using the cloud driver of said control interface, the step of deploying said component on the corresponding cloud provider.

The method according to the third aspect of the invention may also have one or more of the following characteristics, considered individually or according to any technically possible combinations thereof.

In an embodiment, the method further comprises:

for each control interface of the system, the step of receiving from, the component deployed by said control interface, events related to the state of said component;

for each control interface of the system, the step of of transmitting the received events to the initial control interface;

the step of receiving, by the initial control interface said events; and the step of transmitting, by the initial control interface, said events to the user.

In an embodiment, the method further comprises:

for each control interface of the system, the step of checking the status of the components running on its cloud provider;

for each control interface of the system, the step of comparing the status of a component to the attributes of said component;

for each control interface of the system, when the attributes are not respected, the step of transmitting an alert to the initial control interface;

a step of receiving, by the initial control interface, said alerts;

a step of transmitting, by the initial control interface, said alerts to the user.

In an embodiment, the method further comprises the step of, when receiving an alert concerning one or more components, redeploying, by the initial control interface, the application.

A fourth aspect of the invention relates to a computer program comprising instructions which, when the program is executed by a computer, cause the computer to carry out the method according to the third aspect of the invention.

A fifth aspect of the invention concerns a computer-readable data carrier having stored thereon the computer program according to a fourth aspect of the invention.

BRIEF DESCRIPTION OF THE FIGURES

Other characteristics and advantages of the invention will become clear from the description that is given thereof below, by way of indication and in no way limiting, with reference to the appended figures, among which.

DETAILED DESCRIPTION

For greater clarity, identical or similar elements are marked by identical reference signs in all of the figures. For consciousness, when a reference appears as Xi in the figure where X is a letter and i is a number (for instance CI1, CI2, etc), then the reference X without the subscript designate all references with the letter X (for instance, C refers to C1, C2, etc.).

A Control Interface for the Deployment of Applications

Figure 1:
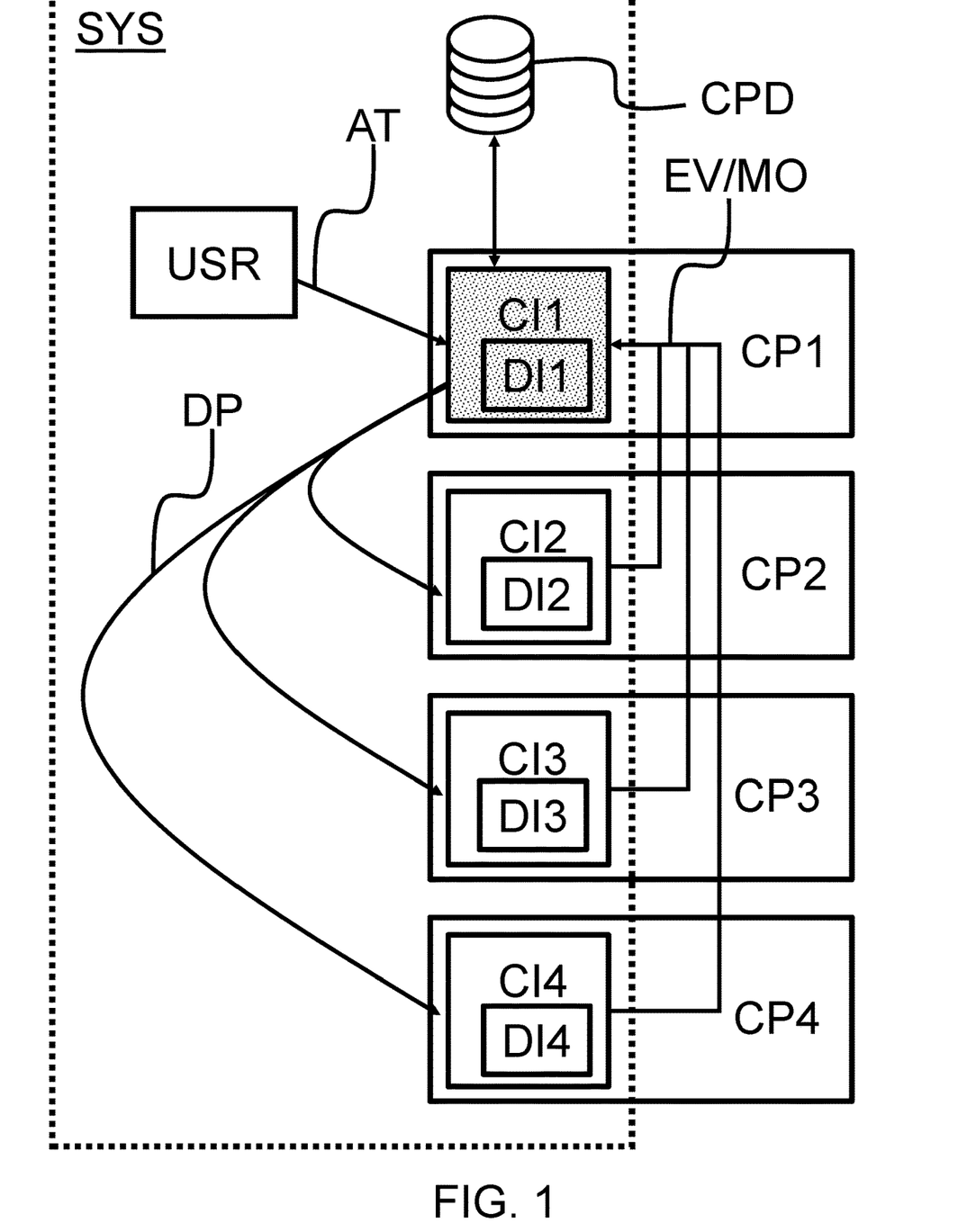
FIG. 1 is a schematic of a system according to the invention.

A first aspect of the invention illustrated in FIG. 1 (in the context of a broader system SYS) concerns a control interface CI for the deployment of an application, said control interface CI running on a specific cloud provider CP. The control interface CI according to the invention is connected to a plurality of other control interfaces CI running on a plurality of cloud providers CP. The control interface CI according to the invention is further connected to a cloud provider database CPD storing a description of each cloud provider CP of the plurality of cloud providers CPD.

It should be understood from the above paragraph that the control interface CI is implemented by means of a computer program running on real and/or virtual hardware. Therefore, the term "means for" should be interpreted as programmed to perform such operation using of one or more real and/or virtual hardware components such as a network card, a memory, and/or a processor, etc.

To interact with the cloud provider CP on which it is running, the control interface CI comprises a cloud driver DI specific to said cloud provider CP. The cloud driver DI allows the control interface CI to instruct the cloud provider CP to deploy one or more components of an application. This cloud driver DI is acting similarly to the driver of video card or any other driver device in the sense that it abstracts the specificity of the cloud provider CP. Furthermore, like any driver, it takes advantage of all the features provided by the cloud provider CP and not only the features common to all cloud providers CP. In other words, the features available through the cloud driver DI are not limited to a common denominator of the features provided by every cloud provider CP.

The control interface CI of the invention also comprises means to receive, from a user USR, an attribute file describing an application to deploy. The attribute can contain a link to the source code of the application to deploy. Alternatively, the source code can be provided by the user USR alongside the file containing the attributes of the application. In an embodiment, the attributes comprise at least one of the following information/restrictions.

The restriction can be related to legal consideration (e.g. GDRP) and/or geographical considerations (e.g. Europe, United States, etc.). Sometimes, those two considerations are interlinked. For instance, the respect of the GDPR imposes certain restriction about the location of the possible servers. The restrictions can also be related to intrinsic properties of the application to deploy, for instance type, horizontal or vertical scalability, affinity and anti-affinity rules, and migration rules. The restrictions can also be related to network performances, for instance maximum latency to access a particular data source and among application components. The restriction can also be related to security, for instance a requirement for security certifications at the cloud provider CP, risk level in terms of probability of the cloud provider CP breaching the service level agreement (often referred as SLA) the user is able to assume for the application. The restriction can also be related to energy consumption, for instance boundaries in terms of power consumptions or greenhouse gas/carbon emissions. The restriction can also be related to economical consideration, for instance boundaries in terms of overall cost limits or cost per operation per hour.

The control interface CI of the invention further comprises means to select, for each components of the application, based on the descriptions provided by the cloud provider database CPD and the attribute file, a cloud provider CP suitable for the deployment of said component. In other words, the control interface CI uses the description of the different cloud providers CP provided by the cloud provider database CPB to identify one or more cloud providers CP where a given component of the application can be deployed while respecting the constraints contained in the attribute file.

The control interface CI of the invention further comprises for each selected cloud providers CP, means to send to the corresponding control interface CI the component to deploy. The deployment takes place on a plurality of cloud providers CP, each one of them being chosen to fulfill the requirements described in the attribute file.

The control interface CI of the invention further comprises when receiving a component to deploy from another control interface CI of the plurality of control interface CI, means to deploy said component using the cloud driver DI.

More precisely, the control interface CI uses its cloud driver DI to instruct the cloud provider CP to deploy the component, for instance using the APIs provided by said cloud provider CP. The deployment of the component also includes opening the network routes and security measure between the different component needed by the application. Therefore, the different components of an application can be deployed in different cloud providers CP without the need for the user USR to consider the specificity of each cloud provider CP. This is made possible by the presence, for each cloud provider CP, of a control interface CI according to the invention that can abstract the specificity of the cloud provider CP thanks to the cloud driver DI.

In an embodiment, the control interface CI comprises means to receive, from the deployed components, events EV related to the state of said component. In other words, the control interface CI will receive all the events emitted by all the components it has deployed in the cloud provider CP on which it is running.

Furthermore, the control interface CI according to the invention can forward those events to other control interfaces CI. To do so, the control interface CI further comprises means to transmit the received events EV to one or more control interfaces CI of the plurality of control interfaces CI.

Of course, similarly, the control interface CI can receive events from other control interfaces CI of the plurality of control interfaces CI. Therefore, the control interface CI further comprises means to receive events from other control interfaces CI of the plurality of control interfaces CI.

Eventually, the control interface CI needs to forward the collected events EV to the user USR. To do so, the control interface CI further comprises means to transmit to the user USR events EV relating to the components of the deployed application. These events may have been received directly by the control interface CI or received by means of other control interface CI from the plurality of control interfaces CI.

It can also be useful to monitor the deployed component to check if they respect the attributes based on which they were deployed. To perform such a monitoring MO, in an embodiment, the control interface CI comprises means to check the status of the component running on its cloud provider CP.

The status of the component can concern one of the following elements. It can concern the application intrinsic properties (metadata) like type, horizontal or vertical scalability affinity and anti-affinity rules, and migration rules. It can also concern maximum latency to access a particular data source and among application components. It can also concern restrictions to a particular set of geographies versus the cloud provider's region. It can also concern required security certifications for the cloud providers CP. It can also concern risk level in terms of probability of the cloud provider CP breaching the SLA the user is able to assume for the application. It can also concern boundaries in terms of power consumptions or green-house gas/carbon emissions. It can also concern boundaries in terms of overall cost limits or cost per operation hour. In other words, the status provides one or more elements needed to evaluate if the attributes used for the deployment are respected.

The control interface CI further comprises means to compare the status of a component to the attributes of said component. For instance, if the attribute imposes a minimum bandwidth, the bandwidth of a component can fail below this minimum bandwidth. In this case it is important to detect this evolution and to report it.

To do so, the control interface CI further comprises, when the attributes are not respected, means to transmits an alert to the user USR and/or to one or more control interfaces CI of the plurality of control interfaces CI. Of course, since it will transmit such alert to other control interfaces CI, it will also receive alerts from other control interfaces CI of the plurality of control interfaces CI. Therefore, the control interface CI according to the invention also comprises means to receive alerts from other control interfaces CI of the plurality of control interfaces CI. In an embodiment, the control interface CI comprises, when an alert is emitted for a given component, to redeploy the application associated with said component. It means that the attributes will be revaluated, the cloud providers CP selected (considering the alert — for instance, the alert could modify, preferably temporarily, the description in the cloud provider database CPD for the cloud provider(s) CP concerned by the alert(s)) and the component will be deployed again.

A Computer System for the Deployment of Applications

It is possible, using a plurality of control interface CI according to the invention, to build a system SYS for the deployment of applications. Therefore, a second aspect of the invention illustrated in FIG. 1 concerns a computer system SYS for the deployment of applications. More particularly, the system SYS can be used to deploy one or more applications based on attributes provided by a user USR.

The computer system SYS of the invention comprises a plurality of control interfaces CI according to the first aspect of the invention. Therefore, in the system SYS according to the invention, each control interface CI is running on a cloud provider CP. For instance, a first control interface CI1 is running on a first cloud provider CP1, a second control interface CI2 is running on a second cloud provider CP2, a third control interface CI3 is running on a third cloud provider CP3 and a fourth control interface CI4 is running on a fourth cloud provider CP4. Furthermore, each control interface CI comprises a communication means such as a network card, a virtual network or any other means that allows communication between the control interfaces CI of the system SYS. The network formed by the control interfaces is called a mesh interface. In this mesh interface, control interface CI can communicate directly or indirectly through one or more intermediate control interfaces CI. Each control interface CI also comprises a cloud driver DI specific to the cloud provider CP on which the control interface CI is running. In the previous example, the first control interface CI1 comprises a cloud driver DI1 specific to the first cloud provider CP1, the second control interface CI2 comprises a cloud driver I12 specific to the second cloud provider CP, the third control interface CI3 comprises a cloud driver D13 specific to the third cloud provider CP3 and the fourth control interface CI4 comprises a cloud driver DI4 specific to the fourth cloud provider CP4.

The system SYS according to the invention also comprises a cloud provider database CPD containing a description of a plurality of cloud providers CP on which the control interfaces CI of the plurality of control interfaces CI are running. As already described, the cloud provider database CPD makes it possible to select one or more cloud providers according to their description. In the example of FIG. 1, the cloud provider database CPD contain a description of the first, second, third and fourth cloud providers CP1, CP2, CP3, CP4.

Furthermore, the system SYS is configured to, using one control interface CI of the plurality of control interfaces CI, said initial control interface CI, read a file provided by a user USR and containing the attributes of an application to deploy. The only difference between the initial control interface CI1 (in grey on FIG. 1) and the other control interfaces CI2,CI3,CI4 of the system SYS is that the initial control interface CI1 is the one that received the attribute file from the user USR. In an embodiment, the initial control interface CI1 to which the attributes are transmitted is chosen by the user USR. Alternatively, the initial control interface CI1 is chosen by the system SYS based on the location of the user USR. Other criteria can also be considered such as network latency or regulation rules. As it will be apparent form the description of the system SYS, the initial control interface CI1 will act as a main control interface CI1 and send instructions to the other control interfaces CI2,CI3,CI4 of the system SYS. Furthermore, when they need to report some information to the user USR, the other control interfaces CI2,CI3,CI4 must go through the initial control interface CI1 and do not communicate directly with the user USR. This architecture facilitates the events EV management and the monitoring MO of the deployed components.

For each component of the application, the system SYS is also configured to determine, using the initial control interface CI1 and based on the descriptions provided by the cloud provider database CPD and the attributes of the application, the possible deployment solutions offered by the plurality of cloud providers CP. In other words, as already described, the initial control interface CI1 uses the description of the different cloud providers CP provided by the cloud provider database CPB to identify one or more cloud providers CP where a given component of the application can be deployed to respect the constraints contained in the attribute file.

For each selected cloud provider CP and using the initial control interface CI1, the system SYS is also configured to send the component to deploy to the corresponding control interfaces CI. For instance, if the application comprises four components, the initial control interface CI1 can send a first component to deploy to itself, a second component to the second control interface CI1, a third component to the third control interface CI3, a fourth component to the fourth control interface CI4. Of course, this is an example, and several components can be sent to the same control interface CI while other control interfaces CI receive none.

For each control interface CI receiving a component to deploy, using the cloud driver DI of said control interface CI, the system SYS is further configured to deploy said component on the corresponding cloud provider CP. For instance, the components received by the initial control interface CI1 (sent by itself) will be deployed on the first cloud provider CP1 using the driver DI1 of the initial control interface CI1. Similarly, the components sent to the second (third or fourth) control interface CI will be deployed on the second (third or fourth) cloud provider CP using the driver DI of the second (third or fourth) control interface CI.

In an embodiment, to report events related to each component to the user, each control interface CI of the system is configured to: receive from, the components they have deployed, events EV related to the state of said components and to transmit the received events EV to the initial control interface CI1. In other words, the first (second, third or fourth) control interface CI will receive events EV from the components running on the first (second, third or fourth) cloud provider CP.

Furthermore, the initial control interface CI1 is configured to receive said events EV. In other words, in the example of FIG. 1, the second, third and fourth cloud interfaces CI2, CI3,CI4 will forward to the initial control interface CI1 the events they received from the component running on their respective cloud providers CP2,CP3,CP4. Then, the initial cloud provider will transmits said events EV to the use USR. In other words, the initial control interface CI1 transmits the events EV it received directly (from components running on the first cloud provider CP1) as well as the ones that were emitted by components running on other cloud providers CP2,CP3,CP4 and forwarded by the other control interfaces CI2,CI3,CI4. This centralization of events EV reporting facilitates the handling of said events EV by giving an overview of all components of the deployed application.

In an embodiment, to monitor MO the deployed components, each control interface CI of the system SYS is configured to check the status of the components running on its cloud provider CP; compare the status of the components to the attributes of said components; and when the attributes are not respected, transmits an alert to the initial control interface. Such alerts are gathered in a similar fashion than the events EV. In other words, the initial control interface CI1 is configured to receive said alerts and transmit said alerts to the user USR. Once again, the centralization of such alerts facilitates their handling and allows to monitor all the components of the application in one point (i.e., the initial control interface CI1).

In an embodiment, the initial control interface CI1 is configured to, when receiving an alert concerning one or more components, redeploy the application associated with said component. As already described, it means that the attributes will be revaluated, the cloud providers selected (considering the alert—for instance, the alert could, preferably temporarily, modify the description in the cloud provider database CPD for the cloud provider(s) CP concerned by the alert(s)) and the component will be deployed again. The monitoring of the invention ensures that the attributes are always respect for each component of the application, and that the application can be redeployed to ensure such a condition.

An Attribute-Based Method 100 for the Deployment of Applications

A third aspect of the invention concerns an attribute-based method 100 for the deployment of applications using a computer system SYS according to the second aspect of the invention.

Figure 2:
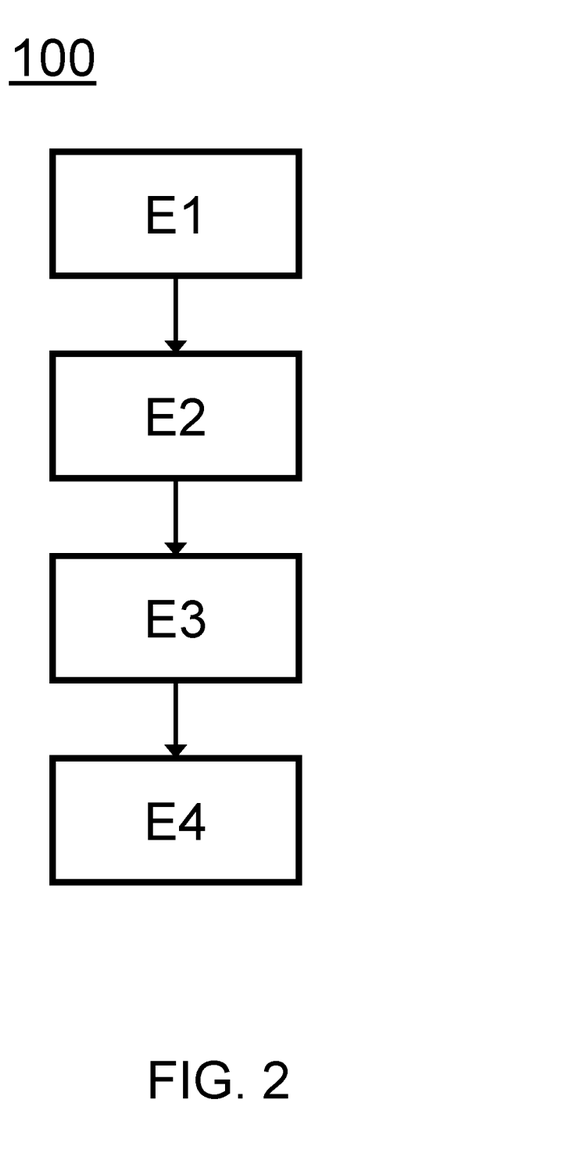
FIG. 2 is a logogram of the method according to the invention.

The method 100 comprises, using one control interface CI of the plurality of control interfaces CI, said initial control interface CI, the step E1 of reading a file provided by a user USR and containing the attributes of an application to deploy.

The method 100 further comprises, for each component of the application, using the initial control interface CI, the step E2 of determining, based on the descriptions provided by the cloud provider database CPD and the attributes of the application, the possible deployment solutions offered by the plurality of cloud providers CP.

The method further comprises, for each selected cloud provider CP, using the initial control interface CI, the step E3 of sending the component to deploy to the corresponding control interfaces CI.

The method also comprises, for each control interface CI receiving a component to deploy, using the cloud driver DI of said control interface CI, the step E4 of deploying said component on the corresponding cloud provider CP.

In an embodiment, the method further comprises:
for each control interface CI of the system, the step of receiving from, the components deployed by said control interface, events EV related to the state of said components;
for each control interface CI of the system, the step of transmitting the received events EV to the initial control interface CI1;
the step of receiving, by the initial control interface CI1 said events EV; and
the step of transmitting, by the initial control interface CI1, said events EV to the user USR.

In an embodiment, the method further comprises:
for each control interface CI of the system SYS, the step of checking the status of the components running on its cloud provider CP;
for each control interface CI of the system SYS, the step of comparing the status of the components to the attributes of said components;
for each control interface CI of the system SYS, when the attributes are not respected, the step of transmitting an alert to the initial control interface;
a step of receiving, by the initial control interface CI1, said alerts;
a step of transmitting, by the initial control interface CI1 said alerts to the user USR.

In an embodiment, the method further comprises, when receiving an alert concerning one or more components, the step of redeploying, by the initial control interface CI1, the application. As details before, redeploying the application means that the steps of the method 100 described above will be reiterated to redeploy the application, this new iteration taking into account the fact that there was an alert (for instance, the alert could modify, preferably temporarily, the description of cloud provider database CPD for the cloud provider(s) CP concerned by the alert(s)).

What is claimed is:

1. An initial control interface (CI) for deployment of an application, said initial control interface (CI) running on a specific first cloud provider (CP), said initial control interface (CI) being connected to a plurality of other control interfaces running on a plurality of cloud providers, said initial control interface (CI) being further connected to a cloud provider database (CPD) storing a description of each cloud provider of the plurality of cloud providers, the initial control interface (CI) comprising:
  a first cloud driver (DI) specific to the specific first cloud provider (CP) on which the initial control interface (CI) is running, said first cloud driver (DI) allowing the initial control interface (CI) to instruct the specific first cloud provider (CP) to deploy one or more components of an application, such that said first cloud driver corresponds only to said specific first cloud provider to instruct deployment;
  means to receive, from a user (USR), an attribute file describing the application to deploy;
  means to select, for each component of the one or more components of the application, based on the description of each cloud provider provided by the cloud provider database (CPD) and the attribute file, a cloud provider suitable for the deployment of said each component, such that said each cloud provider is specific to and corresponds to a corresponding control interface, wherein said cloud provider database (CPD) comprises a description of said specific first cloud provider (CP) and a description of at least a specific second cloud provider of said plurality of cloud providers;
  for said each cloud provider that is selected, means to send to said corresponding control interface a component of the one or more components to deploy, such that such that said initial control interface is configured to communicate with said plurality of other control interfaces;

when receiving another component to deploy from another control interface of the plurality of other control interfaces, means to deploy said another component using a second cloud driver that corresponds to said specific second cloud provider, such that said another control interface runs on said specific second cloud provider that is different than said specific first cloud provider, wherein each control interface of said initial control interface and said plurality of other control interfaces comprises a network card, a memory and a processor, wherein said each control interface further comprises
means to check a status of the one or more components running on the first specific cloud provider,
means to compare the status of the one or more components to attributes of the one or more components,
when the attributes are not respected, means to transmit an alert to the initial control interface from said each control interface of said plurality of other control interfaces,
means to receive the alert from said each control interface of said plurality of other control interfaces in a centralized manner to monitor all components of the one or more components of the application in the initial control interface, and
means to transmit the alert received at the initial control interface from said each control interface to the user.

2. The initial control interface (CI) according to claim 1 wherein the control interface further comprises
means to receive, from the component that is deployed, events (EV) related to a state of said component;
means to transmit the events (EV) that are received to one or more control interfaces of the plurality of other control interfaces;
means to receive events from other control interfaces of the plurality of other control interfaces;
means to transmits said events (EV) to the user.

3. The initial control interface (CI) according to claim 1 wherein the initial control interface further comprises
when the attributes are not respected, means to transmit said alert to the user (USR) and/or one or more control interfaces of the plurality of other control interfaces.

4. The initial control interface (CI) according to claim 3, further comprising, when said alert is emitted for a given component of the one or more components, means to redeploy the application.

5. A computer system (SYS) comprising: a plurality of control interfaces (CI) comprising an initial control interface and other control interfaces; and a cloud provider database (CPD) containing descriptions of a plurality of cloud providers (CP) on which each control interface of the plurality of control interfaces (CI) are running, wherein said each control interface of the plurality of control interfaces being connected to the cloud provider database (CPD) and between themselves to form a mesh interface, wherein said each control interface comprises a cloud driver (DI) of the plurality of cloud providers on which the each control interface is running, said cloud driver (DI) allowing the each control interface to instruct a specific cloud provider of the plurality of cloud providers to deploy one or more components of an application, such that said cloud driver of said initial control interface of said plurality of control interfaces corresponds only to a specific first cloud provider of said plurality of cloud providers to instruct deployment; means to receive, from a user (USR), an attribute file describing the application to deploy; means to select, for each component of the one or more components of the application, based on the descriptions of each cloud provider of the plurality of cloud providers provided by the cloud provider database (CPD) and the attribute file, a cloud provider suitable for deployment of said each component of the one or more components, such that said each cloud provider is specific to and corresponds to a corresponding control interface, wherein said cloud provider database (CPD) comprises a description of said specific cloud provider (CP) and a description of at least a specific second cloud provider of said plurality of cloud providers; for said each cloud provider that is selected, means to send to said corresponding control interface a component of the one or more components to deploy, such that such that said each control interface is configured to communicate with said initial control interface and said other control interfaces; when receiving another component to deploy from another control interface of the other control interfaces, means to deploy said another component using a cloud driver that corresponds to said specific second cloud provider, such that said initial control interface receives the another component to deploy and said another control interface runs on said specific second cloud provider that is different than said specific first cloud provider; wherein said each control interface further comprises a network card, a memory and a processor; wherein the computer system is configured to using the initial control interface of the plurality of control interfaces (CI), read the attribute file provided by said user (USR) and containing attributes of the application to deploy; check a status of the one or more components running on the specific first cloud provider; compare the status of the one or more components to said attributes of the application to deploy; for each component of the one or more components of the application, using the initial control interface, determine, based on the descriptions provided by the cloud provider database (CPD) and the attributes of the application, possible deployment solutions offered by the plurality of cloud providers (CP); for said each cloud provider that is selected, using the initial control interface, send the component to deploy to the corresponding control interface; for said each control interface of the plurality of control interfaces receiving the component to deploy, using the cloud driver (DI) of said each control interface, deploy said component on a corresponding cloud provider; when the attributes are not respected, transmit an alert to the initial control interface from said each control interface of said plurality of control interfaces; receive the alert, via said initial control interface, from said each control interface in a centralized manner to monitor all components of said one or more components of the application in the initial control interface; transmit the alert received at the initial control interface, from said each control interface, to the user.

6. The computer system (SYS) according to claim 5,
wherein, said each control interface of the computer system is further configured to
receive from, the one or more components that have deployed, events (EV) related to a state of said one or more components; and
transmit the events (EV) that are received to the initial control interface;
and the initial control interface is configured to
receive said events (EV); and
transmit said events (EV) to the user (USR).

7. The computer system (SYS) according to claim 5, wherein the initial control interface is further configured to, when receiving said alert concerning said one or more components, redeploy the application.

8. An attribute based deployment method using a computer system (SYS), the computer system comprising a plurality of control interfaces (CI) comprising an initial control interface and other control interfaces, wherein each control interface of the plurality of control interfaces comprises a network card, a memory and a processor; and a cloud provider database (CPD) containing descriptions of a plurality of cloud providers (CP) on which each control interface of the plurality of control interfaces (CI) are running, wherein said each control interface of the plurality of control interfaces being connected to the cloud provider database (CPD) and between themselves to form a mesh interface, wherein said each control interface of the plurality of control interfaces further comprises a cloud driver (DI) of the plurality of cloud providers on which the each control interface is running, said cloud driver (DI) allowing the each control interface to instruct a specific cloud provider of the plurality of cloud providers to deploy one or more components of an application, such that said cloud driver of said initial control interface of said plurality of control interfaces corresponds only to a specific first cloud provider of said plurality of cloud providers to instruct deployment; the attribute based deployment method comprising: using the initial control interface of the plurality of control interfaces (CI), reading a file provided by a user (USR) and containing attributes of an application to deploy; selecting, for each component of the one or more components of the application, based on the descriptions of each cloud provider of the plurality of cloud providers provided by the cloud provider database (CPD) and the file, a cloud provider suitable for deployment of said each component of the one or more components, such that said each cloud provider is specific to and corresponds to a corresponding control interface, wherein said cloud provider database (CPD) comprises a description of said specific cloud provider (CP) and a description of at least a specific second cloud provider of said plurality of cloud providers; checking a status of the one or more components running on the specific first cloud provider; comparing the status of the one or more components to said attributes of the application to deploy; for said each component of said one or more components of the application, using the initial control interface, determining, based on the descriptions provided by the cloud provider database (CPD) and the attributes of the application, possible deployment solutions offered by the plurality of cloud providers (CP); for said each cloud provider that is selected, using the initial control interface, sending the one or more components to deploy to a said corresponding control interface of the plurality of control interfaces (CI), such that said each control interface is configured to communicate with said initial control interface and the other control interfaces; when receiving, by the initial control interface, another component to deploy from another control interface of the other control interfaces, means to deploy said another component using a second cloud driver that corresponds to said specific second cloud provider, such that said another control interface runs on said specific second cloud provider that is different than said specific first cloud provider for said each control interface receiving the one or more components to deploy, using a cloud driver (DI) of said each control interface, deploying a component of the one or more components on a corresponding cloud provider; when the attributes are not respected, transmit an alert to the initial control interface from said each control interface of said plurality of control interfaces; receive the alert, via said initial control interface, from said each control interface in a centralized manner to monitor all components of said one or more components of the application in the initial control interface; transmit the alert received to the user.

9. The attribute based deployment method according to claim 8, further comprising
   for said each control interface of the computer system, receiving from, the one or more components deployed by said each control interface, events (EV) related to a state of said one or more components;
   for said each control interface of the computer system, transmitting the events (EV) that are received to the initial control interface;
   said receiving, by the initial control interface said events (EV); and
   said transmitting, by the initial control interface, said events (EV) to the user (USR).

10. The attribute based deployment method according to claim 8, further comprising, when receiving said alert concerning said one or more components, redeploying, by the initial control interface, the application.

11. The attribute based deployment method according to claim 8, wherein the computer system further comprises a program product comprising a computer program with instructions which, when the computer program is executed by a computer of the computer system, cause the computer to implement the attribute based deployment method.

12. The attribute based deployment method according to claim 11, wherein said computer system further comprising a non-transitory computer-readable data carrier having stored thereon the computer program.

* * * * *